United States Patent [19]
Franz

[11] 3,770,195
[45] Nov. 6, 1973

[54] TEMPERATURE CONTROL SYSTEM AND VACUUM MODULATOR VALVE THEREFOR

[75] Inventor: Rudolph J. Franz, Schaumburg, Ill.

[73] Assignee: Eaton Corporation, Cleveland, Ohio

[22] Filed: Mar. 24, 1972

[21] Appl. No.: 237,766

[52] U.S. Cl. ............ 236/13, 236/87, 236/101, 237/12.3 A
[51] Int. Cl. .......................................... G05d 23/13
[58] Field of Search ............. 236/87, 91, 13, 101; 237/12, 3 A, 2 A; 165/42

[56] References Cited
UNITED STATES PATENTS

| | | | |
|---|---|---|---|
| 3,455,505 | 7/1969 | Beatenbough et al. | 236/87 |
| 3,476,316 | 11/1969 | Franz | 237/2 A |
| 2,946,509 | 7/1960 | Radtke et al. | 236/87 |
| 3,452,928 | 7/1969 | Stark | 236/87 X |
| 3,373,934 | 3/1968 | Kolbe et al. | 236/87 X |

Primary Examiner—William E. Wayner
Attorney—Carlton Hill et al.

[57] ABSTRACT

Automatic vacuum controlled air conditioner control, for regulating the temperature of the passenger compartment of an automotive vehicle in accordance with ambient and in-car air temperatures in which the vacuum controls of the system is balanced commensurate with the vacuum required to position the controls for preselected temperature requirements.

18 Claims, 7 Drawing Figures

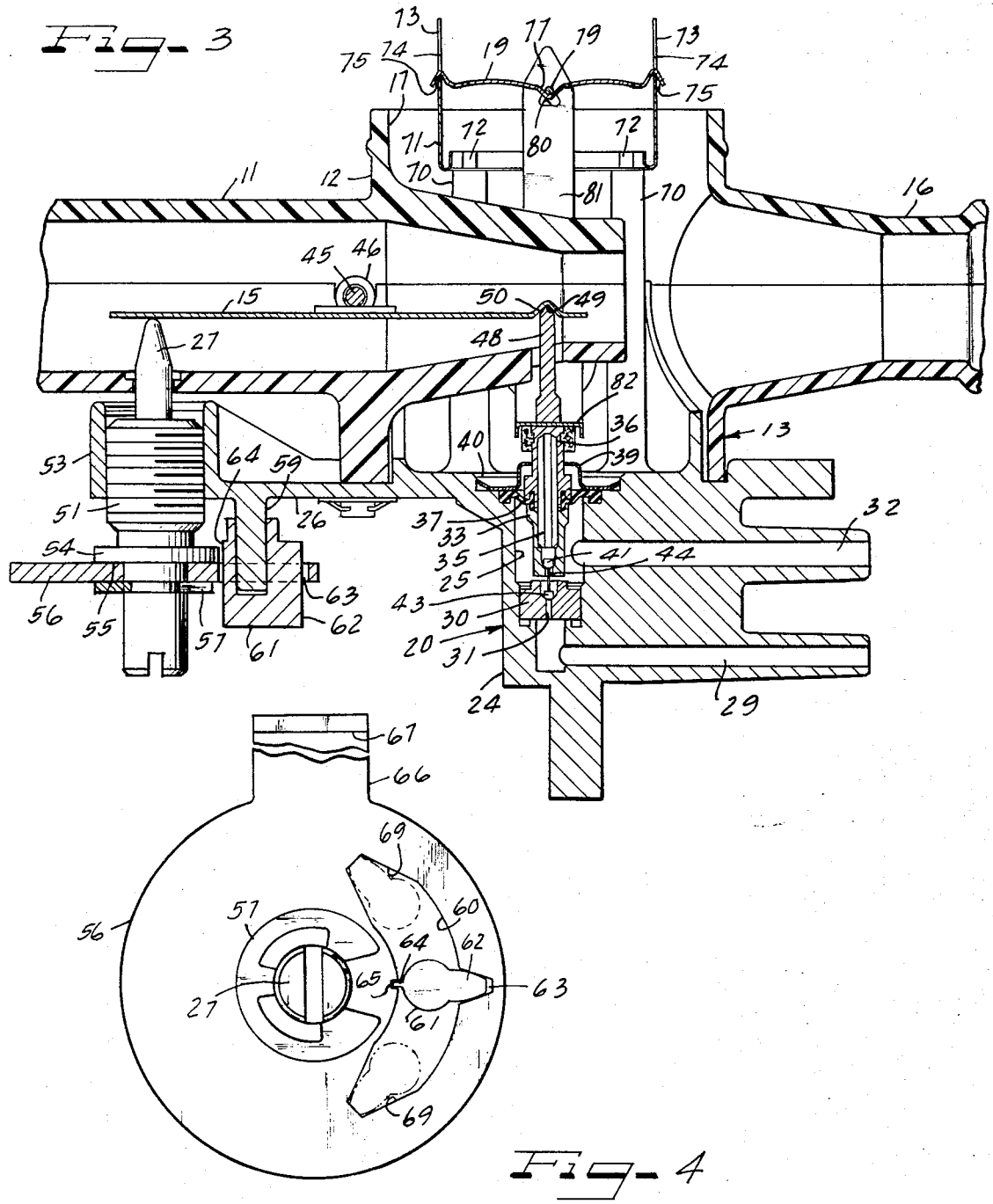

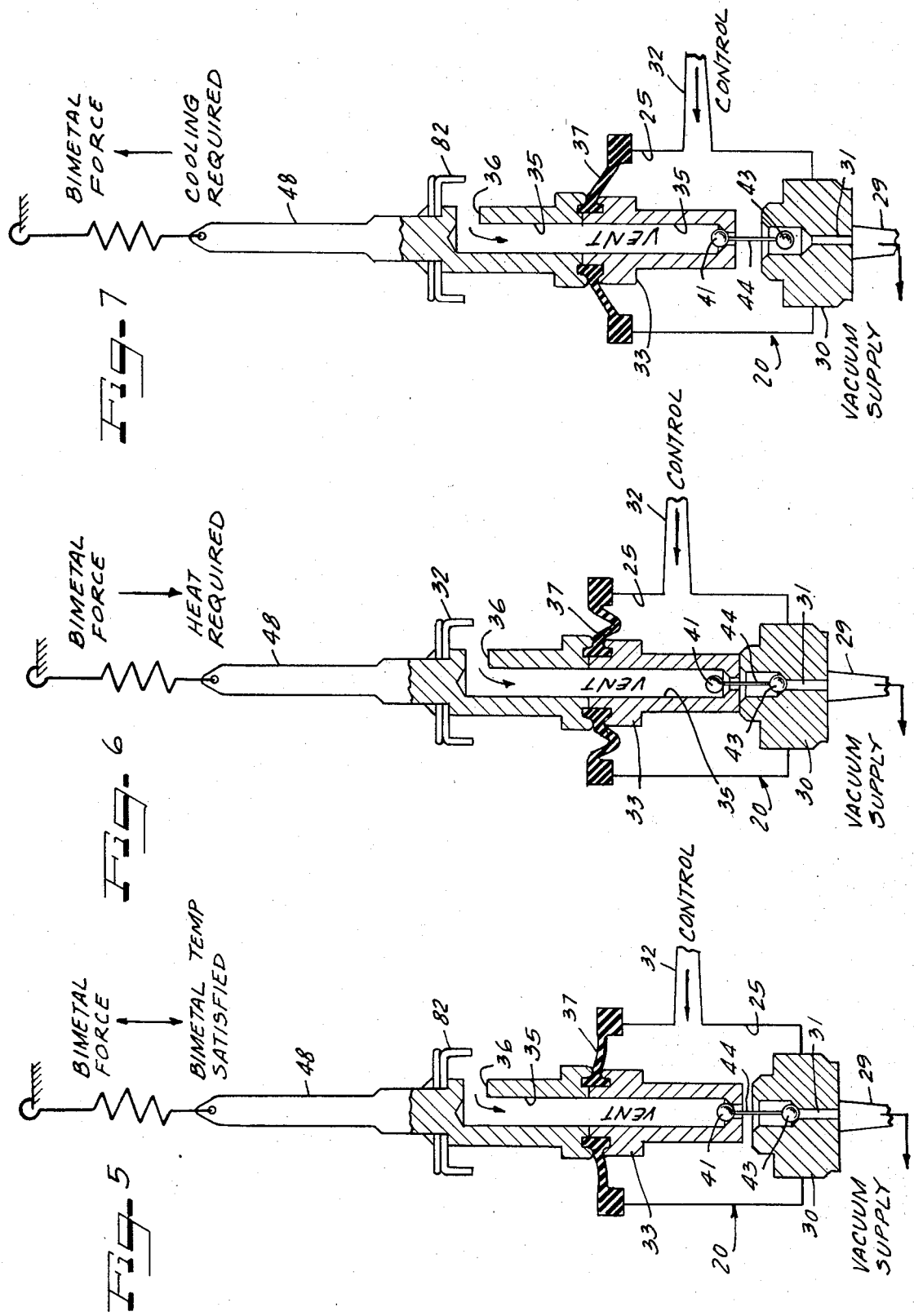

TEMPERATURE CONTROL SYSTEM AND VACUUM MODULATOR VALVE THEREFOR

FIELD OF THE INVENTION

Automotive vehicle air conditioning system and temperature responsive vacuum modulator valve therefor.

BACKGROUND, SUMMARY, ADVANTAGES AND OBJECTS OF INVENTION

Heretofore vacuum control valves have been provided for supplying a controlled vacuum to the vacuum operated components of air conditioning systems. In such valves the degree of vacuum has been regulated by the temperature of ambient and in-car air blown over individual cooperating bimetal elements. Such valves and systems are disclosed in the patents to Beatenbough et al. U.S. Pat. No. 3,455,505; Kolbe et al. U.S. Pat. No. 3,373,934 and Gaskill et al. U.S. Pat. No. 3,263, 739. The vacuum control valves of these patents, except for that of Gaskill et al. U.S. Pat. No. 3,263,739, operate on the continuous bleed principle, bleeding air into or from a vacuum chamber, to provide the required vacuum to operate a control element such as an air flow damper, and the air bleed valve is only closed when the system is turned off, or under extreme temperature conditions.

The control system and vacuum modulator valve of the present invention improves upon the prior art vacuum controls in that the ambient and in-car thermally responsive elements cooperate to provide a balanced system, balancing vacuum in the vacuum chamber of the valve when the vacuum required to maintain the temperature of the vehicle at a preselected temperature is reached. At this time the air and vacuum control valves are closed.

The balanced system of the present invention results in a more accurate and faster temperature responsive control than the prior control systems, and makes practical the use of vacuum controlled by cooperating ambient and in-car bimetal elements, to automatically operate and control the control elements of the air conditioning system.

Another advantage of the invention is the arrangement and mounting of the in-car and bimetal temperature responsive elements in such a manner as to enable the use of bimetal elements of minimum thickness with a resultant faster response to temperature changes than has heretofore been possible, with prior temperature responsive vacuum control devices.

A further advantage of the invention is the provision of a thin in-car bimetal element in the form of a beam, supported at its ends on metal supports and bowed from said supports to opposite sides of a transverse central recess thereof, receiving a pin connected at its ends to a saddle, operabe to move the vacuum control valve into its vent and vacuum input positions, in which all of the supporting parts of the bimetal element and the operating parts of the valve are of substantially the thickness of the bimetal element, to thereby avoid the transmission of heat within the housing to the bimetal element, and to attain a more accurate temperature responsive element than has heretofore been possible with the vacuum modulator devices theretofore in use.

A principal object of the present invention, therefore, is to provide a faster acting and more accurate temperature responsive control for vacuum modulator valves, operating on the principle of balancing the in-car and ambient bimetal forces with the required vacuum to effect a control operation, and against the force exerted by a preloading device for one of the bimetal elements, adjustable to select the vacuum for a required control function.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 3 is a transverse sectional view taken substantially along line III—III of FIG. 2.

FIG. 4 is a bottom plan view showing the calibration stop; and

FIGS. 5, 6 and 7 are diagrammatic views showing the vacuum control valve in its various operating conditions.

DESCRIPTION OF PREFERRED EMBODIMENT OF INVENTION

Figure 1:
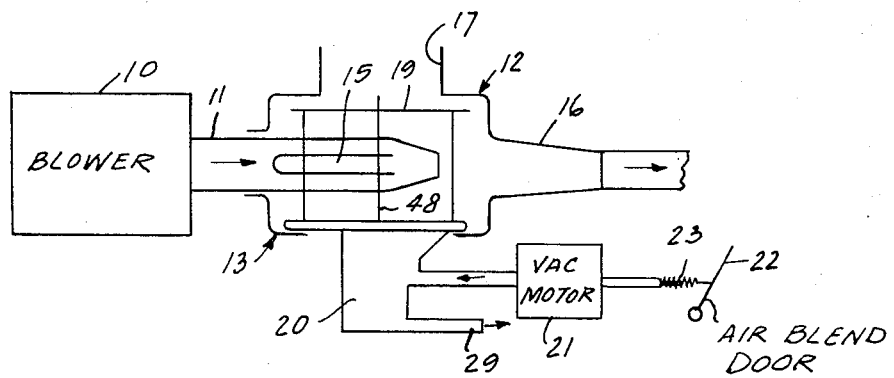
FIG. 1 is a schematic view diagrammatically illustrating the principal components of an air conditioning system constructed in accordance with the principles of the present invention.

In FIG. 1 of the drawings, the rudimentary components of an automotive air conditioning system are generally shown, excluding the electrical controls for the system necessary to render the system fully automatic. In the system shown, a blower 10 forces ambient air through an air duct 11 leading into a housing 12 of a vacuum modulator valve 13. An ambient bimetal temperature responsive element 15 is shown as extending along said air duct, responsive to changes in the temperature of air blown from outside of the vehicle along the air duct 11. The air duct 11 converges at its discharge end within said housing, and terminates into a reduced cross-sectional area neck, directing air through an axially aligned converging air duct 16, converging from the wall of said housing to a reduced diameter air duct. The converging air duct 11 cooperates with the converging duct 16 to aspirate air at the temperature of air within the passenger compartment into the housing 12 along a port 17 and in-car temperature responsive element 19.

The ambient temperature responsive element 15 and the in-car temperature responsive element 19 form modulating temperature responsive elements connected with a vacuum control valve 20 (FIG. 3) to balance the forces of vacuum, to supply a preselected vacuum to a vacuum motor 21.

The vacuum motor 21 is shown as being connected with an air blend door or damper 22 through an overtravel spring 23, to control the volume of air passing along the evaporator of an air conditioner and to thereby supply cooled air to the passenger compartment of the automotive vehicle, to maintain a preselected air temperature in the passenger compartment, sensed and selected by the vacuum modulator valve 13, by preloading the ambient bimetal temperature responsive element 15. The vacuum modulator valve 13 is usually mounted behind the dashboard of the vehicle to provide an accurate output signal proportional to the in-car and ambient air temperatures, to provide the required vacuum to properly regulate the position of the blend door 22 by the vacuum motor 21.

In summary, of the simple elementary system schematically shown, the control signal for temperature changes is made up of the two independently varying forces of the ambient temperature responsive element 15 and the in-car temperature responsive element 19, as controlled by a third force adjustable to select the preload of the ambient temperature responsive element, and thereby select the control point of the valve.

The vacuum control valve 20 includes a valve casing 24 having a vacuum chamber 25 therein. The valve casing 24 is made from metal uneffected by average temperature conditions. Said valve casing has an open spider-like arm 26 forming a support for a calibrating screw 27 for the ambient bimetal element 15 and also forming a support for the ambient bimetal temperature responsive element 15 intermediate its ends, and a support for the in-car bimetal element 19 in the inlet for in-car air into the valve housing 12, as will hereinafter more clearly appear as this specification proceeds.

A vacuum supply line 29 enters the casing 24 adjacent the lower end thereof and may have connection with a source of vacuum, such as the intake manifold of the automotive vehicle, through a suitable vacuum accumulator (not shown), in a manner well-known to those skilled in the art, so not herein shown or described further. Spaced along the vacuum chamber 15 from the vacuum supply line 29 is a valve seating member 30, seated in said vacuum chamber 25 adjacent the lower end thereof and suitably sealed thereto. The valve seating member 30 has a central passageway 31 leading axially therealong, and stepped with its large diameter end facing the end of the vacuum chamber 25 opposite the vacuum supply line 29, to form a seat for a vacuum control valve 43. A vacuum output 32 leads into the valve chamber 25 on the opposite side of the valve seating member 30 from the vacuum input 29, and is adapted to have connection with the vacuum motor 21, controlling the position of the air blend door 22 through a suitable vacuum distributor (not shown) or through a direct connection through a suitable vacuum line (not shown). Extending axially along the valve chamber 25 and mounted therein for axial movement with respect thereto, is an air vent member 33 having an air chamber 35 extending therealong and having a vent opening 36 outside of the vacuum chamber 25, and venting said vacuum chamber to atmosphere to modulate the vacuum therein, and thereby effect a change in position of the air blend door 22, to effect a change in the temperature of air in the passenger compartment. A diaphragm 37 extends about and is sealed to the top of the vacuum chamber 25 and is sealed to and supports the air vent member 33 for axial movement along said vacuum chamber in accordance with temperature conditions. A retainer 39, seated in a recessed upper face 40 of the valve casing 24, retains the peripheral portion of said diaphragm in sealing engagement with the vacuum chamber 25 and may also form a guide for the air vent member 33.

The air vent chamber 35 terminates at its lower end in a seat for an air vent valve 41 having connection with the vacuum control valve 43 seated in the enlarged portion of the vacuum passageway 31, through a stem 44.

Thus, as the air vent member 33 moves away from the valve seating member 30, the air vent valve 41 seats on its seat and moves the vacuum control valve 43 off of its seat to increase the vacuum in the chamber 25 and exert a force on the diaphragm 37 against the independent forces of the ambient bimetal element 15 and the in-car bimetal element 19 in a direction to reseat the valve 43 and open the air vent valve 41 to vent the vacuum chamber 25 and reduce the vacuum therein.

The ambient bimetal thermally responsive element 15 is transversely pivoted intermediate its ends on a pivot pin 45 extending through a boss 46 extending upwardly of the top surface of the ambient bimetal element 15 and suitably mounted thereon. The pivot pin 45 extends across the ambient intake air duct 11, through opposite sides of said duct, and is mounted at its opposite ends on upright arms 47 formed integrally with the spider-like arm 26, and extending upwardly therefrom along opposite sides of said ambient intake air duct.

In axial alignment with a control pin 48, extending upwardly of the air member 33, and formed as a part thereof, is a downwardly opening generally V-shaped recessed portion 49 of the thermally responsive element 15 seated on a tapered upwardly extending end 50 of the control pin 48. The top end of the tapered end 50 may be rounded to provide a uniform bearing area for the V-shaped recessed portion 49 of the ambient bimetal element 15.

At the opposite end of the ambient bimetal element 15 from the control pin 48 in the adjustment screw 27 engaging the underside of said bimetal element and loading said bimetal element as modulated by the bimetal element 19 to balance the vacuum in the chamber 25 in accordance with the vacuum required to provide a selected air temperature in the passenger compartment of the automotive vehicle. The adjustment screw 27 has a tapered upper end spherical at its apex to provide a uniform bearing engagement surface with the ambient bimetal element 15. Said adjustment screw has an enlarged diameter intermediate portion 51, which is shown as being threaded and which may be a double-lead thread. The intermediate portion is threaded in a boss 53, formed integrally with the spider-like arm 26. Beneath the enlarged portion 51 of the adjustment screw 27 is a radial flange 54, which forms a shoulder 55 for an adjustment disk 56, retained thereto as by a snap ring 57. The lower end of the adjustment screw 27 is slotted to accommodate turning of the screw by a screwdriver, to initially calibrate said screw and the bimetal element 15, prior to securing the disk 56 thereto. A pin 59 extends downwardly from the spider-like arm 56 into an arcuate slot 60, formed in the disk 56. The pin is shown in FIGS. 3 and 4 as having a stop member 61 pivotally mounted thereon, which may be retained thereto, for pivotal movement with respect thereto in a suitable manner. The stop member 61 has a gear tooth 62 formed integrally therewith and extending therefrom within a rack tooth recess 63 communicating with the slot 60 and extending radially therefrom at the transverse center of said slot. The stop member 61 also has a lug 64 extending radially therefrom within a notch 65 opening to the slot 60 and in diametrically opposed relation with respect to the rack tooth recess 63.

When the tooth 62 is in mesh with the rack tooth recess 63 and the lug 69 is in engagement with the slot 65, the adjustment screw 27 will have been calibrated and the disk 56 may be secured thereto in fixed relation with respect thereto. The disk 56 has an actuator arm 66 extending radially therefrom having a depending outer end portion 67 adapted to be connected with a conttol knob or a slidably movable control at the dashboard (not shown) through a Bowden wire and the like (not shown) to load the ambient bimetal element 15 in accordance with temperature requirements. When the disk 56 is initially adjusted after calibration of the adjustment screw, to attain a selected temperature, said disk will turn in a clockwise or counterclockwise direction from its position shown in FIG. 4. During adjustment of said disk, the rack tooth-like recess 63 will pivot the stop member 61 about its axis and break off the by 64 as said stop member is moved to position the gear tooth 62 within the slot 63. Said gear tooth in one of its extreme positions may move into either one of two converging tooth-like ends 69 of the slot 60, dependent upon the direction of turning movement of said disk 56. As herein shown the disk 56 may move 45° to each side of the center of the arcuate slot 60 to effect the required temperature adjustment.

If it should become necessary to again calibrate the thremally responsive element, thermally disk 56 may be removed from the adjustment screw 27. As the thermally responsive element is calibrated, the stop member 61 will be in position to register with the rack tooth-like recess 63, as the disk is replaced on said adjustment screw.

Figure 2:
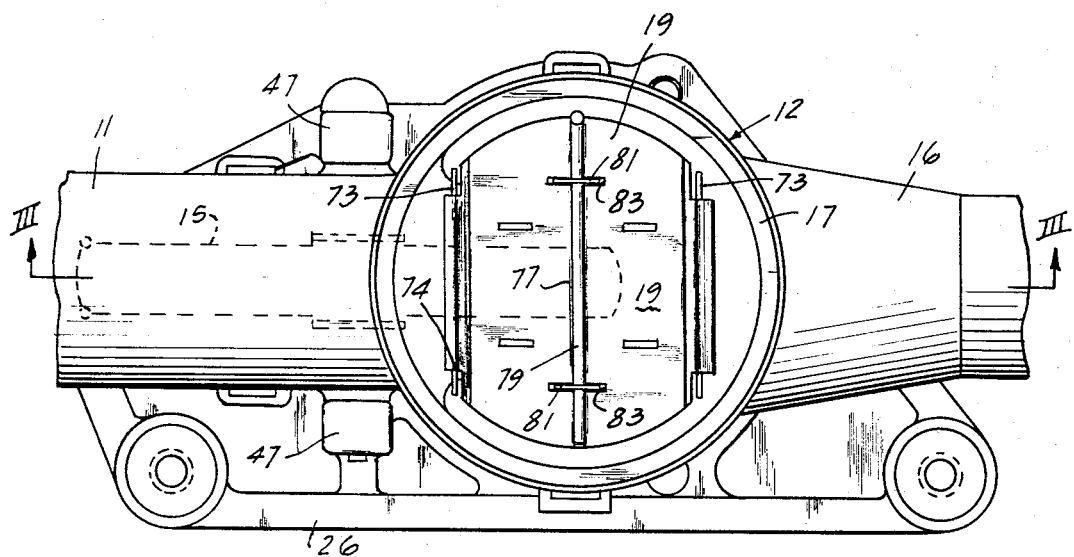
FIG. 2 is a top plan view of the vacuum modulator valve shown in FIG. 1, with the screen and cap extending over the in-car passageway into the valve housing removed.

The in-car bimetal element 19 is of a relatively wide beam-like form extending over a major portion of a cross-sectional area of the in-car air inlet 17, as shown in FIG. 2. The support for the in-car bimetal element comprises a pair of aligned parallel arms 70 extending upwardly of the top surface of the casing 24 adjacent opposite sides thereof and forming a mounting for a generally upwardly facing U-shaped saddle or yoke 71. Said yoke is mounted at its base on the tops of the arms 70, as by machine screws 72 extending through the base of said saddle and threaded in the arms 70. The saddle 71 has relatively wide parallel spaced legs 73 extending upwardly from its base. The legs 73 are relatively wide and have widened upwardly opening recessed portions 74, the top surfaces of which recessed portions form generally knife-edge supports for opposite sides of the bimetal element 19.

As shown in FIG. 3, opposite sides of the bimetal element 19 are pressed upwardly to form downwardly opening V-shaped recesses 75 engaging the knife-edge supports between the margins of the recessed portions 74 of the upright legs 73.

The in-car bimetal element 19 also has an upwardly opening downwardly pressed generally V-shaped central recessed portion 77 extending thereacross the apex of which conforms to engage a transverse pin 79. Said pin is carried inwardly of its opposite ends, in generally triangular openings 80 in upright legs 81 of an upwardly opening saddle 82. The legs 81 freely extend through slots 83 in the bimetal element 19. The openings 80 in the upright legs 81 have apices at the tops thereof generally conforming to the form of the pin 79 and forming bearing surfaces for said pin 79, to accommodate a limited amount of relative movement of the saddle 82 with respect to the pin 79 and the thermally responsive element 19. The thermally responsive element 19 is also shown as being slightly bowed in an upward direction on each side of the pin 79, when said element is in a normal condition, with the bowed portions thereof extending from opposite sides of the upwardly opening V-shaped recess 77 to the downwardly opening recessed portions 75 of said element. The base of the yoke 82 is shown in FIG. 3 as being generally channel-like in form and is mounted at its center on the actuator pin 48, to raise and lower said pin independently of the ambient bimetal element 15 upon changes in temperature conditions, requiring either heat or cooling.

The yoke 71 and upright legs thereof and the yoke 82 and the parallel upright legs thereof are preferably made froma stainless steel of the same thickness as the thickness of the bimetal element 19, to avoid the transfer of heat within the housing 12 to the bimetal element 19 through the supports therefor. The bimetal element 19 with the two upwardly bowed sides is shown as being of a beam-like form and is also of a minimum thickness for quick response to temoperature changes. As, for example, the thickness of the bimetal element 19 may be from 0.005 to 0.006 inches thick while the upright legs 73 and 81 may be substantially the same thickness. The ambient bimetal element 15 may also be of the same thickness or slightly thicker than the bimetal element 19 dependent upon the sensitivity and thermal activity required for said bimetal element to cooperate with the bimetal element 19 to balance vacuum in the vacuum chamber 25, as determined by the preload of the bimetal element 15.

Referring now to FIGS. 5, 6 and 7 of the drawings, showing the vacuum control valve in its positions to maintain a predetermined temperature within the passenger compartment of the vehicle, and in its positions requiring heat or cooling, to bring the passenger compartment of the vehicle to the required temperature, in FIG. 5 of the drawings, it will be assumed that the vacuum supplied to the vacuum motor 21 is such as to move the air blend door 22 in position to attain a selected temperature for the interior of the car. In this condition the vacuum control valve and air vent valve are in balanced conditions and are both closed. The bimetal force of the ambient and in-car bimetal elements thus balances the vacuum in the vacuum chamber 25. The air blend door 22 will stay in its selected position until temperature conditions again require a change in the position of said door.

Where the car cools down to the extent that heat is required, the forces of the two bimetal elements 15 and 19 will act to open the air vent valve and accommodate closing of the vacuum valve and vent the chamber 25 to atmosphere. The air vent door will then move toward a closed position into a heat supplying position and will stay in this position until cooling is required. When cooling is required, the bimetal force of the in-car and ambient bimetal elements will act on the pin 48 in a direction to close the air vent valve and open the vacuum valve and connect the vacuum chamber 25 to a source of vacuum until a condition is reached when the required vacuum in the vacuum chamber 25 acting on the diaphragm 37 balances the bimetal forces of the bimetal elements 15 and 19 and the vacuum in the vacuum motor 21 will be sufficient to hold the air blend door 22 in a selected position.

It will be clear from the foregoing that when the vacuum motor 21 is supplied with sufficient vacuum to maintain the air blend door 22 in a required position, the bimetal forces will balance the vacuum in the vacuum chamber 25 acting on the diaphragm 37, and will remain balanced until a temperature condition is reached where the passenger compartment requires heat or cooling, at which time the bimetal force will be unbalanced until the required temperature is reached. The bimetal force will then balance the vacuum in the vacuum chamber and remain in this balanced condition as long as the temperature in the vehicle remains at a preselected relatively constant value.

The bimetal elements thus provide two temperature responsive forces acting to attain a balanced vacuum and a balanced condition of the valves 41 and 43 in the vacuum chamber 25, while the adjustment screw 27 preloading the ambient bimetal element, provides a third force assuring the balancing of the vacuum and valves 43 and 41 by the bimetal elements at the required extent to maintain a preselected temperature condition.

I claim as my invention:

1. In a temperature responsive vacuum modulator valve particularly adapted for automotive air conditioning systems,
   a valve casing having a vacuum chamber therein,
   a vacuum supply line connecting said vacuum chamber to a source of vacuum,
   a vacuum control line spaced along said chamber from said supply line,
   a valve seat in said chamber between said supply line and said vacuum control line,
   an air vent member extending into said vacuum chamber and having an air vent chamber therein,
   a flexible diaphragm sealing said vacuum chamber along its periphery and having sealing engagement with said air vent member and moving said air vent member inwardly along said vacuum chamber upon increases in vacuum,
   said air vent member having a control member extending outwardly therefrom and an air inlet opening on the outside of said vacuum chamber leading into said air vent chamber,
   a valve seat in said air vent chamber in axial alignment with said valve seat in said vacuum chamber,
   air vent and vacuum control valves respectively seated on said air vent valve seat and said vacuum valve seat and connected for conjoint movement, and
   means balancing vacuum in said vacuum chamber and effecting closing of said air vent and said vacuum control valves in accordance with temperature conditions comprising
   an ambient bimetal element in said valve casing and positioned in the flow of ambient air and having bearing engagement with said control member at one end and loaded at its end opposite said control member,
   an in-car bimetal element mounted on said casing in the flow of air at in-car temperature and supported in spaced relation with respect to said casing and having control connection with said control member independently of said ambient bimetal element,
   said ambient and in-car bimetal elements being independent of each other and both having operative connection with said control member to effect movement of said air vent member along said vacuum chamber to balance the forces of vacuum acting on said diaphragm in accordance with temperature conditions.

2. The vacuum modulator valve of claim 1,
   wherein support means are provided for movably mounting said ambient bimetal element in said valve casing intermediate its ends in spaced relation with respect to said control member and positioning said ambient bimetal element in the flow of ambient air to have bearing engagement with said control member at one end, and means loading the end of said ambient bimetal element opposite said control member,
   wherein other support means are provided for mounting said in-car bimetal element on said casing in the flow of air at in-car temperature at its opposite ends in spaced relation with respect to said casing to have control connection with said control member intermediate its ends.

3. The vacuum modulator valve of claim 2,
   wherein the support for the in-car bimetal element on said casing comprises a saddle having a base and parallel upright legs forming knife-edge supports for said in-car bimetal element,
   and wherein the operative connection between said in-car bimetal element and said control member includes a second saddle mounted on said control member intermediate its ends for movement with said member and having parallel upright legs,
   a transverse pin supported on said legs and having bearing engagement with said in-car bimetal element along the transverse center thereof intermediate the knife-edge supports for said in-car bimetal element.

4. The vacuum modulator valve of claim 3,
   wherein the saddles supporting and connecting said in-car bimetal element with said control member are made from a thin metal of substantially the thickness of said in-car bimetal element, to avoid the transfer of heat at ambient air temperatures from the region of said ambient air duct to said in-car bimetal element.

5. The vacuum modulator valve of claim 4,
   wherein the in-car bimetal element is bowed upwardly from its ends and downwardly towards said pin extending across the center thereof.

6. The vacuum modulator valve of claim 1, including,
   a housing extending about said air vent member,
   an in-car inlet leading into said housing,
   an ambient air inlet leading into said housing and having a converging discharge end,
   an axially aligned delivery air duct leading from said housing and converging as it extends from said housing and cooperating with said ambient air duct to aspirate air at in-car temperature into said housing through said in-car inlet,
   support means for said ambient bimetal element on said casing pivotally supporting said ambient bimetal element intermediate its ends to extend along said ambient air duct and to have bearing engagement with said control member at one end,
   means carried by said casing selectively operable to load the opposite end of said ambient bimetal element from said control member and vary the vacuum in said vacuum chamber, support means for said in-car bimetal element in said housing in spaced relation with respect to said control member, and other means connecting said in-car bimetal element with said control member for exerting a force on said control member independently of the force exerted by said ambient bimetal element, to balance the force of vacuum in said chamber acting on said diaphragm.

7. The vacuum modulator valve of claim 6, wherein the support means for the in-car bimetal element in said housing comprises a saddle having a base supported on said casing and parallel upright legs extending vertically of said casing, forming knife-edge supports for opposite ends of said in-car bimetal element, and wherein the operative connection between said in-car bimetal element and said control member includes a second saddle mounted on said control member for movement with said member and having parallel upright legs, a transverse pin supported on said legs and having bearing engagement with the opposite side of said in-car bimetal element from said control member along the transverse center thereof and intermediate the knife-edge supports for said in-car bimetal element.

8. A vacuum modulator valve of claim 7, wherein the saddles supporting said in-car bimetal element and connecting said in-car bimetal element with said control member are made from a thin metal of substantially the thickness of said in-car bimetal element, to avoid the transfer of heat at ambient air temperatures from the region of said ambient air duct to said in-car bimetal element.

9. The vacuum modulator valve of claim 8, wherein the in-car bimetal element is bowed upwardly from its ends and downwardly toward said pin extending across the center thereof.

10. The vacuum modulator valve of claim 6, wherein the means for preloading said ambient bimetal element comprises screw means engaging the opposite end of said bimetal element from said control member, means adjustably moving said screw means comprising a disk mounted on said screw means, remote control means for pivoting said disk and screw means, and means accommodating the calibration of said screw means and the preloading of said ambient bimetal element comprising a lug engageable with said disk, locating said disk in the proper calibrated position of said screw means and breaking off upon assembly of said disk to said screw means and movement of said disk to vary the loading of said ambient bimetal element.

11. The vacuum modulator valve of claim 10, wherein the disk has an arcuate slot therein having a radially extending recess intermediate its ends, wherein a stop including a pin extends within said slot and has a stop member pivoted thereon for movement about an axis parallel to the axis of said calibrating screw, at least one tooth-like projection extending radially from said stop member and adapted to mesh with said radially extending recess, a lug extending diametrically opposite from said tooth-like projection and having locating enagement with said disk, whereby movement of said disk upon calibration of said screw means will effect pivotal movement of said stop member and the breaking off of said lug and the turning of said tooth-like projection into position to accommodate free pivotal movement of said disk to the limit determined by said stop member.

12. In a temperature control system and vacuum modulator valve therefor particularly adapted for air conditioner systems for controlling the temperature of the passenger compartment of an automotive vehicle, and in combination with an air blend door, and a vacuum motor regulating the position of the air blend door and the flow of cool air into the passenger compartment, and a blower forcing air into the passenger compartment, a housing, an ambient air inlet duct leading into said housing supplied with ambient air by said blower, an air outlet duct leading from said housing and having an intake spaced from said ambient air inlet duct and an axial alignment therewith, an in-car air inlet leading into said housing, said ambient air inlet duct cooperating with said outlet air duct to draw air at in-car temperature into said chamber, an ambient bimetal thermally responsive element in said ambient air inlet duct, an in-car bimetal thermally responsive element in said in-car air inlet, a valve casing associated with said housing and having a vacuum chamber, an air vent member leading into said vacuum chamber and mounted for axial movement relative thereto, a vacuum supply leading into said vacuum chamber, a vacuum control line leading from said vacuum chamber and adapted to connect said vacuum motor to a source of vacuum, valve means between said air vent member and said vacuum control line and controling the supply of vacuum to said chamber through said vacuum supply line and the venting of said chamber, a single control member for said valve means, said ambient and in-car bimetal elements exerting independent forces directly on said control member and tending to balance the bimetal force exerted, with vacuum in said chamber, to attain a preselected vacuum in said chamber and the setting of said vacuum motor and air blend door to provide a required temperature.

13. The temperature control system of claim 12, including means mounting said ambient bimetal element intermediate its ends for pivotal movement about a transverse axis to act on said valve means at one end, and means for preloading said ambient bimetal element at its end opposite said valve means, for adjusting the vacuum in said vacuum chamber.

14. The temperature control system of claim 13, including screw means preloading said ambient bimetal element, means adjustably moving said screw means comprising a disk on said screw means, remote control means for pivoting said disk and screw means, and means accommodating the calibration of said screw means to provide the required preloading of said ambient bimetal element to attain a preselected vacuum in said vacuum chamber comprising, a stop for said disk, locating said disk in the proper calibrated position of said screw and breaking off upon assembly of said disk to said screw and movement of said disk to vary the loading of said ambient bimetal element.

15. The temperature control system of claim 14 in which the disk has an arcuate slot therein having a radially extending recess intermediate its ends, wherein the stop includes a pin, a stop member pivotally mounted on said pin, at least one tooth-like projection extending from said stop means and meshing with said radially extending recess, and a locating lug extending diametrically oppositely from said tooth-like projection locating and having locating engagement with said disk, wherby movement of said disk to effect loading of the ambient bimetal element will effect pivotal movement of said stop member and the breaking of said lug and the turning of said stop member into position to accommodate free movement movemnt of said disk and screw means in opposite directions and in amounts limited by said stop member.

16. The temperature control system of claim 12, wherein a diaphragm is sealed to said vacuum chamber and to said air vent chamber, wherein said ambient bimetal element acts on said air vent chamber to exert a force thereon balanced by said diaphragm in accordance with the need for vacuum in said vacuum chamber, wherein said in-car bimetal element is connected with said air vent chamber and exerts an independent force on said air vent chamber modulating the vacuum signal proportionate to the requirement for vacuum in said vacuum chamber.

17. The temperature control system of claim 16, wherein the air vent member has a stem extending axially therefrom, wherein said ambient bimetal element is transversely pivoted intermediate its ends in said ambient air passageway and has engagement with said stem at one end, and wherein a temperature adjustment screw loads said ambient bimetal element to the extent required to balance said in-car bimetal element with vacuum in said vacuum chamber.

18. The temperature control system of claim 17, wherein the support for the in-car bimetal element on said casing comprises a saddle having a base and parallel upright legs forming knife-edge supports for said in-car bimetal element, wherein the operative connection between said in-car bimetal element and said control pin includes a second saddle mounted on said control pin intermediate its ends for movement with said pin and having parallel upright legs, a transverse pin supported on said legs and having bearing engagement with said in-car bimetal element along the transverse center thereof intermediate the knife-edge supports for said in-car bimetal element.

\* \* \* \* \*